(12) United States Patent
Zaidi et al.

(10) Patent No.: US 6,542,981 B1
(45) Date of Patent: Apr. 1, 2003

(54) MICROCODE UPGRADE AND SPECIAL FUNCTION SUPPORT BY EXECUTING RISC INSTRUCTION TO INVOKE RESIDENT MICROCODE

(75) Inventors: Nazar Abbas Zaidi, San Jose, CA (US); Gary Hammond, Fort Collins, CO (US); Kin-Yip Liu, Millbrae, CA (US); Tse-Yu Yeh, Milpitas, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/473,577

(22) Filed: Dec. 28, 1999

(51) Int. Cl.[7] .................................................. G06F 9/24
(52) U.S. Cl. ............................ 712/2; 712/41; 712/211; 712/243; 713/1
(58) Field of Search .......................... 712/41, 243, 209, 712/211; 713/1, 2

(56) References Cited

U.S. PATENT DOCUMENTS

| 4,887,203 A | * 12/1989 | MacGregor et al. | 712/211 |
| 5,950,012 A | * 9/1999 | Shiell et al. | 712/209 |
| 6,138,236 A | * 10/2000 | Mirov et al. | 713/200 |
| 6,154,834 A | * 11/2000 | Neal et al. | 361/736 |

* cited by examiner

*Primary Examiner*—Kenneth S. Kim
(74) *Attorney, Agent, or Firm*—Blakely, Sokoloff, Taylor & Zafman LLP

(57) ABSTRACT

A method and apparatus for invoking microcode instructions resident on a processor by executing a special RISC instruction on the processor such that special functions are provided. In one embodiment, the special function invoked may be a feature of the processor not included in the processor's publicly known instruction set. In another embodiment, the special function invoked may cause a set of instructions to be transferred from a memory external to the processor to a memory in the processor. In such an embodiment, the method and apparatus include authenticating and decrypting the instructions before transferring from the memory external to the processor to the memory in the processor. In such an embodiment, the method and apparatus may be used for upgrading microcode within a processor by executing the special RISC instruction stored on a writeable non-volatile memory located external to the processor. In this embodiment, executing the special RISC instruction invokes resident microcode instructions on the processor to transfer microcode instructions from a memory located external to the processor to memory in the processor so that the microcode upgrade is executed in place of and/or in addition to other microcode resident in the processor. In yet another embodiment, the special RISC instruction could cause instructions to be transferred from a memory external to the processor to be transferred to the processor, decrypted, authenticated and then executed in the processor securely, privately, and without interruption.

24 Claims, 4 Drawing Sheets

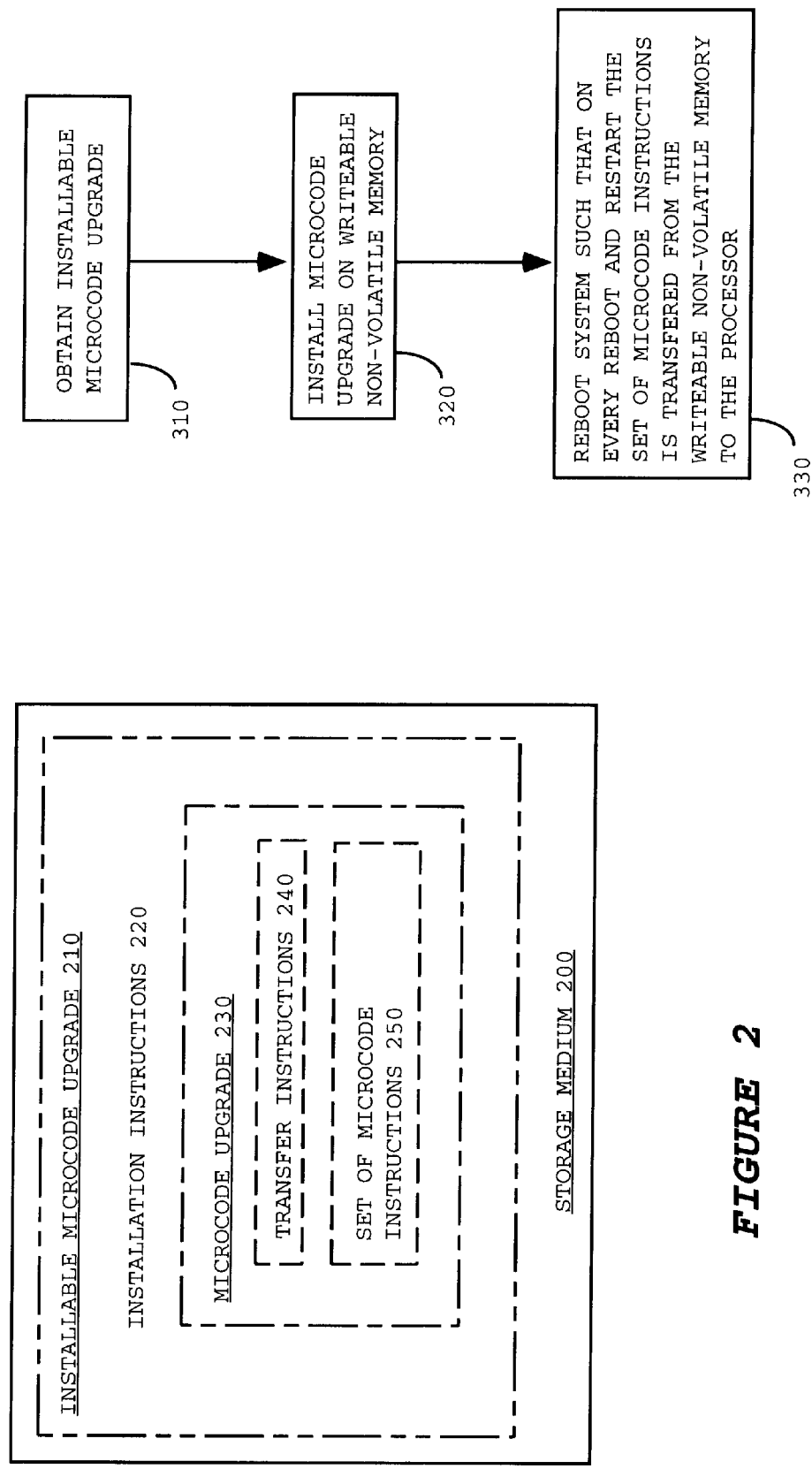

MICROCODE UPGRADE AND SPECIAL FUNCTION SUPPORT BY EXECUTING RISC INSTRUCTION TO INVOKE RESIDENT MICROCODE

FIELD OF THE INVENTION

The present invention relates to the field of invoking microcode instructions resident in a processor by executing a Reduced Instruction Set Computer Instruction ("RISC") instruction. This invention also relates to the field of processor upgrades.

BACKGROUND

Personal computers have become very popular products that are found in many homes and nearly all offices. At the heart of a personal computer is a processor. The processor is a hardware device that is typically the single most expensive component in a personal computer. Processors used in today's most popular computers include software typically referred to as microcode. Microcode within a processor is implemented to achieve a defined set of assembly language instructions which are executed by the processor known as the processor's instruction set. The instructions most commonly supported in processors used in today's most popular personal computers are Complex Instruction Set Computer ("CISC") instructions. To execute CISC instructions, a processor executes microcode which effectively translates the CISC instruction into multiple opcodes, also known as micro-ops and microcode, which are then executed by the processor. Alternatively, Reduced Instruction Set Computer ("RISC") instructions may be supported by a processor. RISC instructions are directly mapped to one micro-op which is the equivalent of the RISC instruction. A processor with a RISC instruction set architecture eliminates the step of translating the instruction and eliminates the invocation of microcode within the processor needed to translate a complex instruction. At present, most processors are either CISC or RISC, but not both.

A reason contributing to the popularity of personal computers is that computers are upgradeable. When a component of a computer becomes outdated or is defective, it can be replaced or upgraded. For example, if a hardware component such as a disk drive or modem becomes outdated or ceases to function, the component can be swapped out and replaced, or repaired and reinstalled. If a software component becomes outdated, the old version can easily be uninstalled, and a new improved version can be installed. In addition, software upgrades are regularly made available to fix errors in software commonly known as bugs. Examples of software components include application programs such as word processors (e.g., Microsoft Word, Corel WordPerfect). Removal and replacement of hardware components is not commonly performed by the typical computer user, while it is common for most computer users to upgrade, uninstall and install software.

Like application programs, microcode instructions implementing CISC assembly language instructions on a processor can be plagued by bugs. Like other kinds of hardware, although a processor can be replaced, such replacement is not common. If a software error or bug is found in a processor, it would be unduly costly for the manufacturer to provide new, updated processors to all of those customers with computers which contain the processor with the error. Moreover, it would be unwieldy to require end users to remove and replace their computers' processors. Likewise, it is too costly to expect and too unwieldy to require computer owners to replace their computers' processors to add additional or enhanced features when new processors are introduced into the marketplace, and to increase the functionality of a computer's processor by adding compatibility with an additional instruction set.

SUMMARY

A method includes fetching a special Reduced Instruction Set Computer ("RISC") instruction stored on a memory device external to a processor. The special RISC instruction is then executed on the processor to achieve a special function responsive to information stored on the processor such that resident microcode instructions are invoked.

BRIEF DESCRIPTION OF THE DRAWINGS

The features and advantages of the present invention will become apparent from the following detailed description of the present invention in which:

FIG. 2 is a representation of one embodiment of the present invention in which a storage medium containing an installable microcode upgrade includes a microcode upgrade.

FIG. 3 is a flow chart depicting the sequence of steps taken to obtain, install and implement a microcode upgrade embodiment of the present invention.

DETAILED DESCRIPTION

Figure 1:
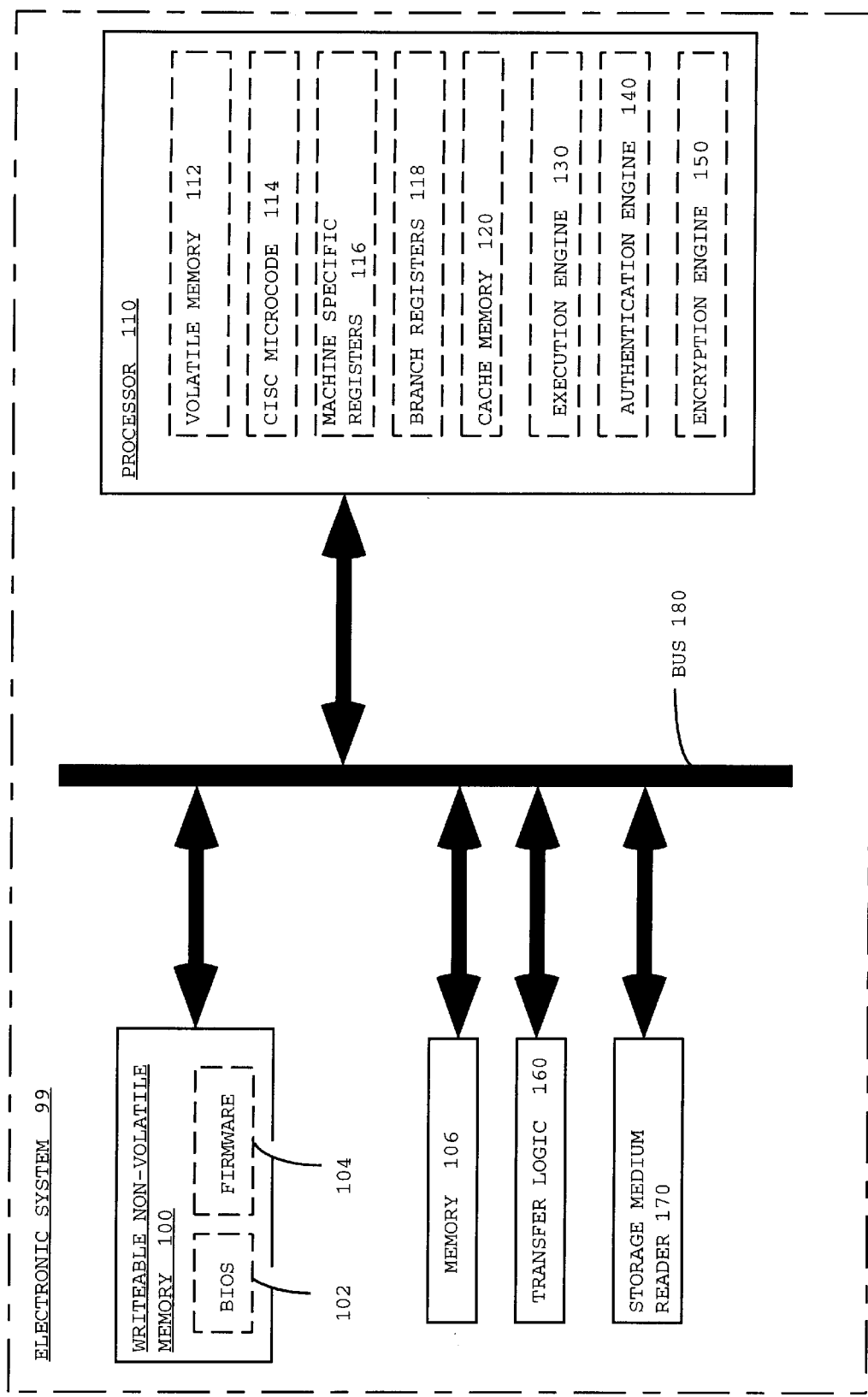
FIG. 1 depicts one embodiment of an electronic system that implements the special RISC instruction achieving special function support via resident microcode of the present invention.

The present invention relates to invoking microcode instructions resident in a processor by executing a Reduced Instruction Set Computer Instruction ("RISC") instruction to provide a special function. This invention also relates to the field of processor upgrades. Herein, certain examples of hardware and methods of operation are described in an illustrative sense, and should not be construed in a restrictive sense.

This invention provides a method and apparatus for invoking microcode instructions resident on a processor by executing a special RISC instruction on the processor such that special functions are provided. In one embodiment, the special function achieved may cause a set of instructions to be transferred from a memory external to the processor to a memory in the processor. In such an embodiment, the method and apparatus include authenticating and decrypting the set of instructions before transferring from the memory external to the processor to the memory in the processor. In this embodiment, the set of instructions would then be executed in the processor securely, privately, and without interruption. This embodiment will be discussed in more detail below. In another embodiment, the special function achieved may be a feature of the processor not included in the processor's publicly known instruction set.

Yet another embodiment of the present invention is a method for a processor to obtain a processor software update, more specifically referred to as a microcode upgrade, from the same memory device which contains the computer's Basic Input/Output System (BIOS). A BIOS is software typically contained in a computer chip that is physically separate from the processor. In many personal computers, and particularly those with processors produced by Intel Corporation of Santa Clara, Calif. during a normal power-on reset, the processor automatically jumps to a predetermined address which is mapped to the computer chip containing BIOS instructions. The processor then sequentially fetches the BIOS instructions. These instructions typically cause the computer to (i) initialize its electronic hardware; (ii) initialize its peripheral devices; and (iii) boot an operating system.

As will be discussed in more detail below, this embodiment adds functionality to the typical BIOS start sequence to provide a microcode upgrade to the processor by adding a special RISC instruction and a set of microcode instructions to the chip containing the BIOS. This special RISC instruction invokes microcode resident on the processor which causes the set of microcode instructions to be transferred from the BIOS chip to the processor such that the set of microcode instructions is executed in place of and/or in addition to other microcode resident in the processor.

To clarify various qualities of the present invention, terminology is used to discuss certain features. In particular, an "electronic system" is defined as any hardware with processing and data storage capability. Examples of electronic systems include computers (e.g., laptop, desktop, hand-held, server, etc.), imaging equipment (e.g., printers, facsimile machines, scanners, etc.), wireless communication equipment (e.g., cellular phones, pagers, etc.), automated teller machines and the like. "Information" is defined as one or more bits o f data, address, control or any combination thereof. A "bus" is any medium used to transfer information.

Referring to FIG. 1, FIG. 1 depicts one embodiment of an electronic system that implements the special RISC instruction achieving special function support via resident microcode of the present invention. Electronic system 99 comprises a writeable non-volatile memory 100 and a processor 110. Writeable non-volatile memory 100 includes non-volatile ("NV") memory such as, for example, programmable read-only memory ("PROM"), erasable programmable read-only memory ("EPROM"), electrically erasable programmable read-only memory ("EEPROM") or flash memory. In an alternative embodiment, memory 106 could be used in place of or in addition to writeable non-volatile memory 100. Memory 106 may be a storage device such as RAM, a hard disk drive, a CD-ROM player, CD read/write ("CD-RW") drive, digital tape drive, a digital video disk ("DVD") player, memory stick device, etc. Processor 110 may be, in one embodiment, a single microprocessor in the ITANIUM™ family manufactured by Intel Corporation of Santa Clara, Calif. However, multiple processors and other kinds of processors may be used.

Referring still to FIG. 1, bus 180 provides a communication path between processing unit 110 and writeable non-volatile memory unit 100. Bus 180 may be a multiplexed bus such as a Peripheral Component Interconnect ("PCI") bus (PCI Local Bus Specification, Rev. 2.2, available from the PCI Special Interest Group, Hillsboro, Oreg., or any other type of bus architecture. It is contemplated that bus 180 includes a single bus (e.g., a PCI bus) as shown, or alternatively, multiple buses coupled together through bridge circuitry (not shown).

As shown in FIG. 1, in one embodiment, storage medium reader 170 is also connected to bus 180. Although only one storage medium reader is depicted, other storage media readers may also be connected to the bus such as a hard disk drive, a CD-ROM player, CD-RW drive, digital tape drive, a DVD player, memory stick device, etc. Other peripheral devices (not shown) may also be connected to bus 180, such as a network interface circuit card, a modem, a sound card, a graphics display adapter, etc.

Continuing to refer to FIG. 1, writeable non-volatile memory 100 contains BIOS instructions 102 and firmware 104. Although BIOS instructions 102 and firmware 104 are shown separately within writeable non-volatile memory 100 in FIG. 1, firmware 104 may be included in BIOS instructions 102. In addition, BIOS instructions 102 and firmware 104 may be addressable at different addresses known to processor 110.

Processor 110 includes volatile memory 112, CISC microcode 114, machine specific registers (MSRs) 116, and branch registers 118. Processor 110 also includes execution engine 130, authentication engine 140 and encryption engine 150. Although each of these engines is depicted separately, the functionality of each of these engines may be combined to form one engine or disbursed among other engines (not shown).

In one embodiment, after processor 110 is manufactured and included in an electronic system such as electronic system 99, the processor manufacturer may want to upgrade the microcode contained in the processor. That is, the special function is a processor upgrade. More specifically, processor 110 includes CISC microcode 114. CISC microcode 114, among other things, contains micro-ops which implement the CISC assembly language instructions which processor 110 executes. To cure a bug in CISC microcode 114 or add new features to processor 110, a processor microcode upgrade may be needed. If there is a bug, it may be in microcode which implements one CISC assembly language instruction, or bugs could exist in microcode which implements multiple CISC assembly language instructions. To provide an upgrade to existing electronic systems which contain a processor which has one or more bugs, a microcode upgrade is distributed to the electronic system owner. In other embodiments, a microcode upgrade can also be provided by a processor manufacturer to enhance the functionality of a processor to meet the hardware functionality of newer processors, to replace the entire set of microcode instructions in a processor, to add a secure microcode program to the processor, to add compatibility with another instruction set to the processor, and to allow the processor to access hardware features on the processor which were reserved (i.e., undisclosed to the public) at the time of initial manufacture and release. Each of these are special functions which may be implemented according to the method and apparatus of the present invention.

Referring now to FIG. 2, FIG. 2 is a representation of one embodiment of the present invention in which a storage medium containing an installable microcode upgrade includes a microcode upgrade. As currently contemplated, installable microcode upgrade 210 is distributed on storage medium 200 such as a floppy disk. Alternatively, installable microcode upgrade 210 is distributed on other storage media such as a CD-ROM, a DVD-ROM, a CD-RW, a memory stick, etc. In addition, installable microcode upgrade 210 may be distributed over a network such as the Internet (not shown) wherein the user of the electronic system (or a technician) downloads installable microcode upgrade 210 from the network to a writeable non-volatile storage medium such as a floppy disk, hard disk, CD-RW, memory stick, etc. Installable microcode upgrade 210 may be part of a BIOS upgrade or may be designated as a processor upgrade. Installable microcode upgrade 210 includes installation instructions 220 and microcode upgrade 230. Microcode upgrade 230 includes transfer instructions 240 and a set of microcode instructions 250.

Referring now to FIG. 3, FIG. 3 is a flow chart depicting the sequence of steps taken to obtain, install and implement a microcode upgrade embodiment of the present invention. After obtaining the installable microcode upgrade, as shown in block 310, the user (or a technician) upgrades the writeable non-volatile memory, as shown in block 320. As currently contemplated, this is achieved by a flash memory upgrade known to those skilled in the art. The flash memory upgrade is a complete BIOS upgrade in which the new BIOS instructions include microcode transfer instructions and microcode upgrade. In this embodiment, when the microcode upgrade is installed, the entire BIOS is replaced, and the firmware is not present. In another embodiment, when the microcode upgrade is installed, the flash upgrade (a) replaces the BIOS instructions with new BIOS instructions which include transfer instructions, and (b) causes the set of microcode instructions to be written to the firmware in the writeable non-volatile memory. In yet another embodiment, the existing BIOS may already include instructions which check whether any information is stored at a particular address on the writeable non-volatile memory corresponding to the firmware. In such an embodiment, installing the upgrade consists of adding the microcode upgrade to the firmware such that the microcode upgrade will be detected by the already existing instruction in the BIOS during booting, restart.

Continuing to refer to FIG. 3, after the microcode upgrade has been installed as shown in block 320, the transfer instructions will be executed by the processor whenever the electronic system is rebooted/restarted, as shown in block 330. When the transfer instructions are executed by the processor, the transfer instructions cause the set of microcode instructions to be transferred to volatile memory of the processor. More specifically, the transfer instructions include a special RISC instruction which invokes microcode resident in the processor to transfer the set of microcode instructions to memory in the processor. This transfer will occur whenever the electronic system is booted or restarted after the microcode upgrade is installed on writeable non-volatile memory, as shown in block 330.

Again, in one embodiment, after the installable microcode upgrade has been installed on writeable non-volatile memory, upon every boot up of the electronic system, the set of microcode instructions is transferred to volatile memory of processor. In an alternative embodiment, the special RISC instruction may be called at any time to provide special function support. Depending on the special function, the set of microcode instructions may, in other embodiments, be a set of CISC or RISC instructions that is transferred to a memory in the processor. In such embodiments, the memory in the processor may be cache memory, embedded memory, registers or RAM. In its various embodiments, the sets of instructions may provide enhancements to the processor, replace the functionality of microcode already existing on the processor, in whole or in part, add a secure program to the processor, add compatibility with another instruction set to the processor, and cause the processor to access hardware features on the processor which were reserved (i.e., undisclosed to the public) at the time of initial manufacture and release.

In one embodiment, one specific instruction, a special RISC instruction, is used to achieve special functions in the processor. This special RISC instruction is a RISC branch instruction designated br.ia. The br.ia instruction has various functionality depending on the contents of various registers when the br.ia instruction is called. The normal functionality of br.ia is described in LA-64 *Application Instruction Set Architecture Guide*, rev. 1.0 published by Intel Corporation of Santa Clara, Calif.

The functionality of br.ia pertinent to this invention is referred to as a branch special RISC instruction. However, although the instruction is part of a RISC instruction set, it is not a traditional RISC instruction and does not necessarily branch, as is known in the art. Although this instruction has the word "branch" in its name, it does not perform a traditional branch instruction, but rather invokes resident microcode instructions to achieve a special function. As a traditional RISC instruction causes a processor to execute one micro-op, this special RISC instruction may be considered a pseudo-RISC instruction because it invokes multiple resident microcode instructions on the processor.

To cause the processor to execute the br.ia as a branch special, certain registers must be set before br.ia is called. Referring again to FIG. 1, processor 110 includes multiple branch registers 118 and MSRs 116. To cause microcode resident in execution engine 130 to request transfer logic 160 to transfer the set of microcode instructions from writeable non-volatile memory 100, additional RISC instructions of the transfer instructions are executed to set various registers appropriately. More specifically, before br.ia is called, RISC instructions are implemented to achieve the following: (a) set one branch register with a specific function number; (b) set another branch register with a return address; and (c) set one MSR to a special value. The return address is an address within writeable non-volatile memory 100. The function number and special value determine which special function will be executed by the resident microcode when the special RISC instruction is called.

Figure 4:
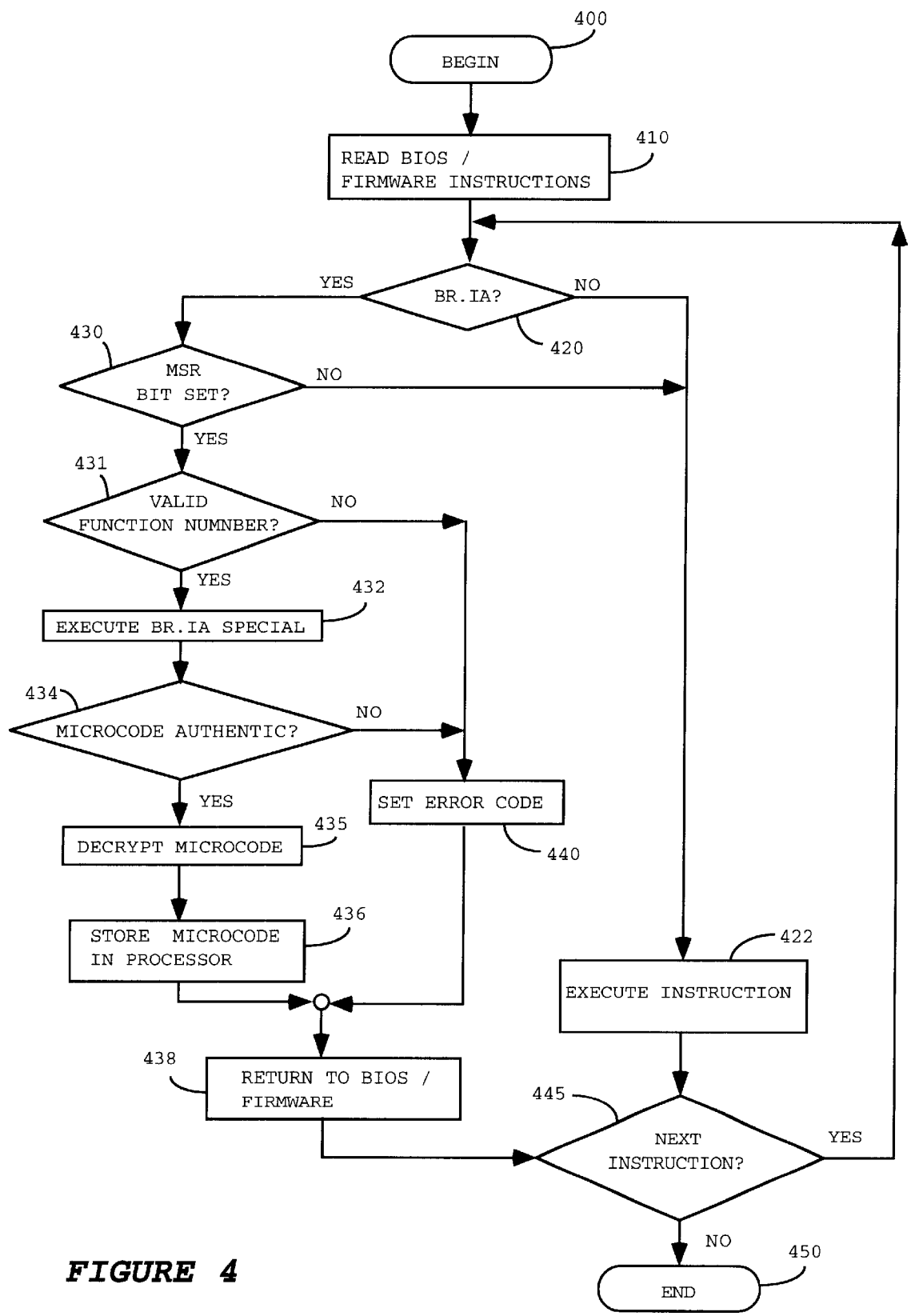
FIG. 4 is a flow chart depicting the sequence of steps taken while executing the method of a microcode upgrade embodiment of the present invention.

Referring now to FIG. 4, FIG. 4 is a flow chart depicting the sequence of steps taken while executing the method of a microcode upgrade embodiment of the present invention. After the microcode upgrade has been installed in writeable non-volatile memory by BIOS update or other method, and after the electronic system is powered on or rebooted, the execution engine of the processor begins at block 400 by executing instructions contained in the BIOS according to methods well known in the art, as shown in block 410. In a preferred embodiment, the execution engine determines whether the current instruction is a br.ia instruction, as shown in block 420. Although there are many instructions which will be encountered, br.ia is the most pertinent that concerns this patent. If the current instruction is not a br.ia, the current instruction is executed, as shown in block 422. The execution engine then sequences to the next instruction as shown in block 445. If there are no further instructions, execution ceases, as shown in block 450. If there are further instructions, the cycle begins again with a check to determine if the next instruction is a br.ia, as shown in block 420.

If the current instruction is a br.ia, the execution engine checks the value of one of the MSRs to determine whether the br.ia is a branch special br.ia for transferring microcode instructions from a non-volatile memory outside a processor to the processor, as shown in block 430. If the appropriate MSR is not set to call a valid special br.ia, the execution continues at block 422. In other embodiments, to determine what kind of special branch is requested, other or multiple MSRs are examined.

The function number in a branch register known to the processor is then examined to determine whether the special function requested of the special br.ia is valid, as shown in block 431. If the appropriate branch register is not set to a valid function number, the execution engine sets an error code as shown in block 440, and execution then continues at the return address specified in one of the branch registers, as shown in block 438. The return address is a location in the writeable non-volatile memory. In alternative embodiments, to determine whether the requested special function is valid, other or multiple branch registers are examined.

If the appropriate MSR is set to call a special br.ia, and a valid function number is specified in the appropriate branch register, the special br.ia is executed invoking microcode resident in the execution engine to provide the special function, as shown in block 432. In one embodiment, the resident microcode causes execution to begin with authentication and decryption of the set of microcode instructions, as shown in blocks 434 and 435. Due to the growing use of electronic mail and the Internet, computers are susceptible to invasive software virus attacks. Software viruses may be obtained during transactions over the Internet such as, for example, downloading data from a web site or retrieving email with unwanted attachments. A software virus may include a program which infiltrates instructions in the BIOS chip in an attempt to take control of the processor and the computer. To preclude making the computer vulnerable to unauthorized infiltration by viruses or other means, the microcode resident in the execution engine providing special function support for a microcode upgrade begins with authentication and decryption of the set of microcode instructions.

The authentication engine of the processor checks whether the set of microcode instructions is authentic, as shown in block 434. The authentication engine achieves this by a one-way hash function or other methods well known in the art. If the set of microcode instructions are not authentic, the execution engine sets an error code as shown in block 440, and execution then continues at the return address specified in one of the branch registers, as shown in block 438. The return address is a location in the writeable non-volatile memory.

If the set of microcode instructions are determined to be authentic, the encryption engine then decrypts the set of microcode instructions, as shown in block 435 of FIG. 4. Decryption is achieved by methods well known in the art. For example, the BIOS may contain a digital (BIOS) certificate and a digital (BIOS) signature (not shown) which are processed by the encryption engine in conjunction with the microcode upgrade or the set of microcode instructions. Alternatively, the microcode upgrade may contain a digital certificate and a digital signature which are processed by the encryption engine.

After the set of microcode instructions is decrypted, in this microcode upgrade embodiment, the microcode resident in the execution engine causes the set of microcode instructions to be stored in the volatile memory of the processor (according to the function number in a branch register known to the processor), as shown in block 436. Alternatively, if the values of one or more of the MSRs and/or one or more of the branch registers are set to certain values, the set of microcode instructions is transferred to a cache memory of the processor and then executed by the execution engine of the processor. In another embodiment, the set of microcode instructions are transferred partially to each of a cache memory and RAM in the processor, and then executed. In yet other embodiments, the set of microcode instructions is transferred to memory embedded in the processor or registers in the processor.

Execution then continues at the return address specified in one of the branch registers which is a location in writeable non-volatile memory, as shown in block 438. The execution engine then sequences to the next instruction, as shown in block 445. If there are no further instructions, execution ceases, as shown in block 450. If there are further instructions, the cycle begins again with a check to determine if the current instruction is a br.ia, as shown in block 420.

Execution of the branch special br.ia instruction invokes microcode resident in the execution which causes the transfer logic to transfer the set of microcode instructions to the volatile memory of the processor such that execution of one or more CISC assembly instructions which would normally occur according to instructions contained in the CISC microcode (see FIG. 1) occurs according to the set of microcode instructions contained in the processor's volatile memory.

Implementation of one embodiment of this method effectively achieves a processor software upgrade and requires only slight changes in processor architecture. In this embodiment, these changes are inclusion of microcode in the execution engine of the processor (a) to implement the special RISC instruction, and (b) to direct execution of a specified CISC instruction on a processor to the set of microcode instructions in the processor's volatile memory in place of the portion of CISC microcode that implements the CISC instruction.

Figure 5:
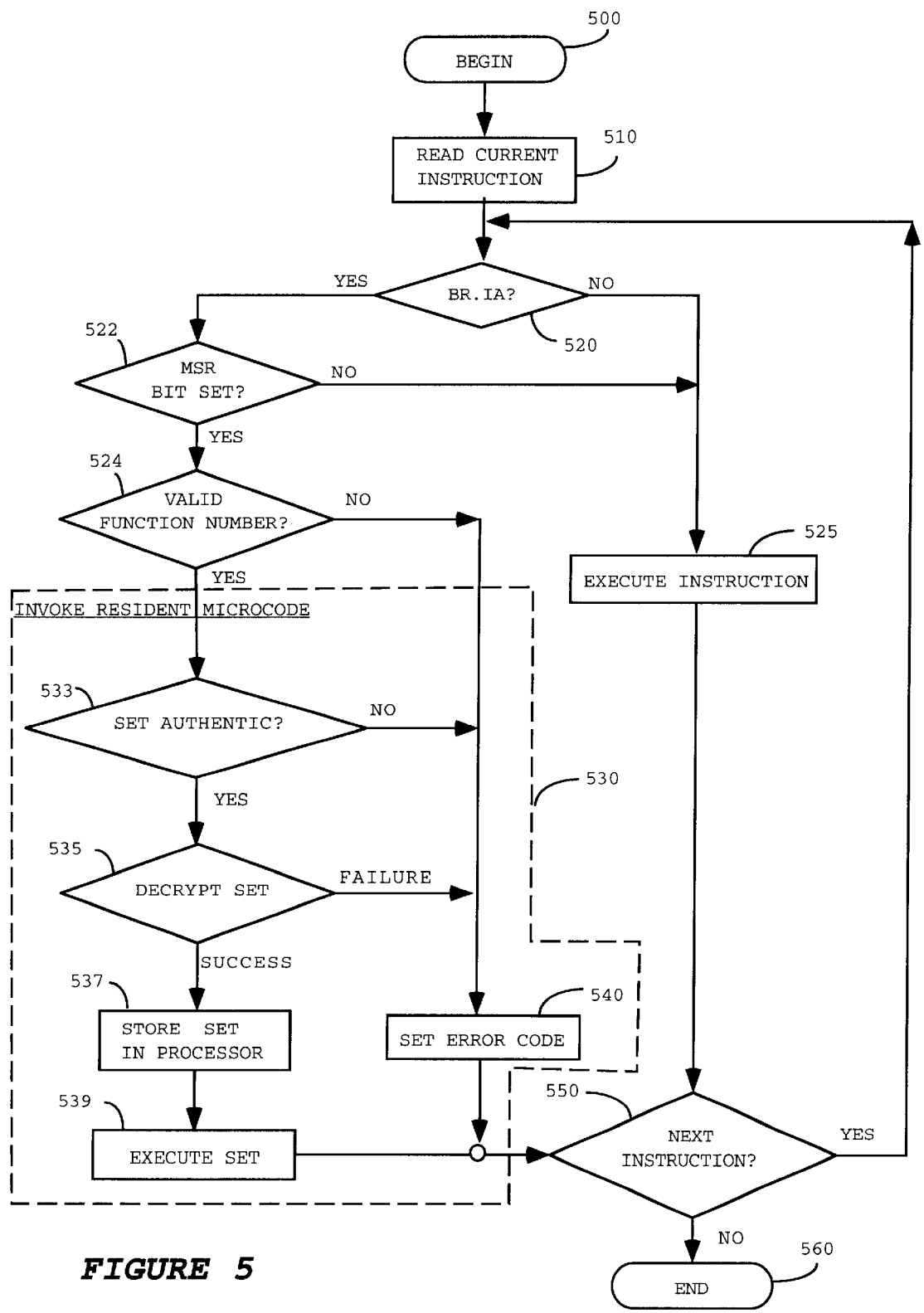
FIG. 5 is a flow chart depicting the sequence of steps taken while executing one embodiment of the special RISC instruction achieving special function support of the present invention.

Referring now to FIG. 5, FIG. 5 is a flow chart depicting the sequence of steps taken while executing one embodiment of the special RISC instruction achieving special function support of the present invention. The typical flow of execution of a processor can be seen by beginning at block 500 where the current instruction is read at block 510. If the current instruction is not a br.ia as shown in block 520, the instruction is executed at block 525. The next instruction is then fetched at block 550. If there are no further instructions, execution ends at block 560. If there are more instructions, the flow returns to block 520 where it is determined if the current instruction is a br.ia.

If the current instruction is a br.ia, the execution engine checks the value of one of the MSRs to determine whether the br.ia is a branch special to achieve a special function, as shown in block 522. If the appropriate MSR is not set to call a special br.ia to achieve a special function, the execution continues at block 525. In other embodiments, to determine what kind of special branch is required and what special function is requested, other or multiple MSRs are examined.

The function number in a branch register known to the processor is then examined to determine whether the special function requested of the special br.ia is valid, as shown in block 524. If the appropriate branch register is not set to a valid function number, the execution engine sets an error code as shown in block 540, and execution then continues at the return address specified in one of the branch registers, as shown in block 550. In alternative embodiments, to determine whether the requested function is valid, other or multiple branch registers are examined.

If the appropriate MSR is set to call a special br.ia, and a valid function number is specified in the appropriate branch register, microcode instructions resident in the execution engine are invoked to perform the requested special function, as shown in block 530. In one embodiment, the special function may be a request to execute a set of instructions securely, privately and without interruption in memory internal to the processor. The set of instructions may include microcode, RISC instructions, or CISC instructions.

In this embodiment, execution begins with authentication and decryption of the set of instructions, as shown in blocks 533 and 535. As the set of instructions may be obtained from any memory device such as memory 106 discussed above with regard to FIG. 1, these steps ensure that control of the processor is not given to instructions which may attempt to harm the electronic system. If the set of instructions is not authenticated as shown in block 533, an error code is set in block 540. Similarly, if decryption of the set of instructions fails as shown in block 535, an error code is set in block 540. In either circumstance, execution will continue at the address specified in one of the branch registers. Alternatively, the microcode resident in the execution engine may provide for error handling.

If the set of instructions was successfully authenticated and decrypted, the set of instructions is then transferred to and stored in a memory in the processor as shown in block 537. Depending on the function specified as determined by viewing processor known MSRs and branch registers, the set of instructions may be stored in a memory in the processor including embedded memory, registers, cache memory or RAM. The set of instructions is then executed as shown in block 539. After execution of the set of instructions has ended, execution continues with the next instruction at the address specified in one of the branch registers as shown in block 560.

In yet another embodiment, calling the special function could cause a set of microcode instructions resident in the processor to be executed securely within the processor. In such an embodiment, implementation does not require authentication or decryption as the microcode is obtained from a secure location inside the processor. In such an embodiment, because the set of microcode instructions is guaranteed to be authentic and is obtained from within the processor, there is no need for authentication, decryption, or storing in the processor. The flow of execution in this embodiment is similar to that shown in FIG. 5, minus blocks 533, 535, and 537. Such an embodiment provides special function support for executing microcode already resident in a processor securely, privately, and without interruption.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A method comprising:
   fetching a Reduced Instruction Set Computer ("RISC") instruction stored on a memory device external to a processor;
   executing the RISC instruction on the processor to achieve a special function responsive to information stored on the processor including invoking resident microcode instructions to transfer a set of microcode instructions from the memory device to a storage memory in the processor to achieve the special function.

2. The method of claim 1 wherein:
   fetching includes fetching additional RISC instructions stored on the memory device; and
   executing further includes executing the additional RISC instructions on the processor before executing the RISC instruction, such that executing the additional RISC instructions causes the information to be stored in the processor.

3. The method of claim 2 wherein executing the additional RISC instructions stores the information in the processor and includes:
   setting at least one machine specific register (MSR) in the processor to a first processor recognized value,
   setting a first branch register in the processor to a return address, and
   setting a second branch register in the processor to a second processor recognized value.

4. The method of claim 3 wherein the first processor recognized value and the second processor recognized value specify the special function.

5. The method of claim 1 wherein the invoking further includes:
   authenticating the set of microcode instructions; and
   decrypting the set of microcode instructions.

6. The method of claim 1 further comprising:
   executing at least one portion of the set of microcode instructions from the storage memory in place of at least one existing Complex Instruction Set Computer ("CISC") instruction supported by the processor.

7. The method of claim 1 wherein the memory device is non-volatile and includes basic input/output system (BIOS) instructions.

8. The method of claim 1 wherein the memory device is a writeable flash semiconductor memory device.

9. The method of claim 1 wherein the executing includes:
   executing the set of microcode instructions from the storage memory.

10. The method of claim 1 wherein the storage memory includes one of registers, RAM and cache.

11. The method of claim 2 further comprising:
    transferring the RISC instruction, the additional RISC instructions and the set of microcode instructions from a storage medium external to the processor to the memory device.

12. A machine readable medium having instructions which when executed by a processor cause the processor to perform operations comprising:
    fetching a RISC instruction stored on a memory device external to the processor;
    executing the RISC instruction to achieve a special function responsive to information stored on the processor including invoking resident microcode instructions to transfer a set of microcode instructions from the memory device to a storage memory in the processor to achieve the special function.

13. The machine readable medium of claim 12 wherein fetching further comprises fetching additional RISC instructions stored on the memory device; and wherein executing further comprises executing the additional RISC instructions on the processor before executing the RISC instruction.

14. The machine readable medium of claim 13 wherein executing the additional RISC instructions further comprises:
    storing the information in the processor including
    setting at least one machine specific register (MSR) in the processor to a first processor recognized value,
    setting a first branch register to a return address, and
    setting a second branch register to a second processor recognized value.

15. The machine readable medium of claim 14 wherein the first processor recognized value and the second processor recognized value specify the special function.

16. The machine readable medium of claim 12 having further instructions which when executed cause the processor to perform operations comprising:

executing at least one portion of the set of microcode instructions from the storage memory in place of at least one Complex Instruction Set Computer ("CISC") instruction supported by the processor.

17. The machine readable medium of claim 12 wherein the executing further comprises:

executing the set of microcode instructions from the storage memory.

18. The machine readable medium of claim 12 having further instructions which when executed cause the processor to perform operations comprising:

authenticating the set of microcode instructions; and decrypting the set of microcode instructions.

19. The machine readable medium of claim 12 wherein the storage memory includes at least one of registers, RAM and cache.

20. The machine readable medium of claim 12 having further instructions which when executed cause the processor to perform operations comprising:

transferring the special RISC instruction and the set of microcode instructions from a storage medium external to the processor to the memory device.

21. A computer system comprising:

a bus;

a memory device coupled to the bus, the memory device including a RISC instruction;

a processor coupled to the bus, the processor including an execution engine to execute the RISC instruction to achieve a special function responsive to information stored on the processor including invoking resident microcode instructions; and transfer logic coupled to the bus, the transfer logic to move a set of microcode instructions from the memory device to a storage memory in the processor responsive to execution of the RISC instructions.

22. The computer system of claim 21 wherein:

the memory device includes additional RISC instructions to store the information on the processor, the additional RISC instructions including an instruction to set at least one machine specific register (MSR) in the processor to a first processor recognized value, an instruction to set a first branch register to a return address, and an instruction to set a second branch register to a second processor recognized value; and wherein the processor executes the additional instructions before executing the special RISC instruction.

23. The computer system of claim 21 wherein the processor further includes:

an authentication engine to authenticate the set of microcode instructions, and an encryption engine to decrypt the set of microcode instructions.

24. The computer system of claim 21 wherein the execution engine executes at least one portion of the set of microcode instructions from the storage memory in place of at least one processor resident set of microcode instructions which implement a Complex Instruction Set Computer ("CISC") instruction supported by the processor.

* * * * *

UNITED STATES PATENT AND TRADEMARK OFFICE
CERTIFICATE OF CORRECTION

PATENT NO.     : 6,542,981 B1
DATED          : April 1, 2003
INVENTOR(S)    : Zaidi et al.

It is certified that error appears in the above-identified patent and that said Letters Patent is hereby corrected as shown below:

Column 6,
Line 5, delete "LA", insert -- IA --.

Signed and Sealed this

Thirtieth Day of September, 2003

JAMES E. ROGAN
*Director of the United States Patent and Trademark Office*